US008946358B2

(12) United States Patent
Pollino et al.

(10) Patent No.: US 8,946,358 B2
(45) Date of Patent: Feb. 3, 2015

(54) CURE ACCELERATION OF POLYMERIC STRUCTURES

(75) Inventors: Joel M Pollino, Alpharetta, GA (US); Joachim C Ritter, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/634,697

(22) PCT Filed: Mar. 22, 2011

(86) PCT No.: PCT/US2011/029339
§ 371 (c)(1),
(2), (4) Date: Sep. 13, 2012

(87) PCT Pub. No.: WO2011/119546
PCT Pub. Date: Sep. 29, 2011

(65) Prior Publication Data
US 2013/0012671 A1  Jan. 10, 2013

Related U.S. Application Data

(60) Provisional application No. 61/316,075, filed on Mar. 22, 2010.

(51) Int. Cl.
C08G 75/16 (2006.01)
C08K 5/053 (2006.01)
C08J 3/20 (2006.01)
C08J 3/24 (2006.01)
C08K 5/13 (2006.01)
C08K 5/134 (2006.01)

(52) U.S. Cl.
CPC . C08K 5/053 (2013.01); C08J 3/20 (2013.01); C08J 3/24 (2013.01); C08K 5/13 (2013.01); C08K 5/134 (2013.01); C08J 2481/02 (2013.01)
USPC ........................................................ 525/537

(58) Field of Classification Search
CPC ........ C08J 3/24; C08J 2481/02; C08K 5/053; C08K 5/13; C08K 5/134
USPC .................... 525/537, 189; 528/481
See application file for complete search history.

(56) References Cited

U.S. PATENT DOCUMENTS

| | | | |
|---|---|---|---|
| 3,264,272 A | 8/1966 | Rees | |
| 3,354,129 A | 11/1967 | Edmonds, Jr. et al. | |
| 3,405,073 A | 10/1968 | Abramoff | |
| 3,489,702 A | 1/1970 | Abramoff | |
| 3,519,598 A | 7/1970 | Larsen | |
| 3,776,880 A * | 12/1973 | Blackwell | 524/25 |
| 4,351,931 A | 9/1982 | Armitage | |
| 4,383,080 A | 5/1983 | Dupree et al. | |
| 4,418,029 A | 11/1983 | Reed et al. | |
| 4,426,479 A | 1/1984 | Deguchi et al. | |
| 4,686,250 A | 8/1987 | Qureshi | |
| 4,774,276 A | 9/1988 | Bobsein et al. | |
| 4,801,492 A | 1/1989 | Skinner et al. | |
| 4,801,664 A | 1/1989 | Nesheiwat et al. | |
| 5,028,674 A | 7/1991 | Hatch et al. | |
| 5,175,200 A * | 12/1992 | Harry, Sr. | 524/194 |
| 5,179,165 A * | 1/1993 | Harry, Sr. | 525/189 |
| 5,191,020 A | 3/1993 | Masamoto et al. | |
| 5,372,760 A | 12/1994 | Wellenhofer et al. | |
| 5,470,901 A | 11/1995 | Ishiwari et al. | |
| 5,654,358 A | 8/1997 | Kadoi et al. | |
| 5,723,542 A | 3/1998 | Hwang et al. | |
| 5,786,422 A | 7/1998 | Mizutani et al. | |
| 5,811,492 A | 9/1998 | Mori et al. | |
| 5,852,139 A | 12/1998 | Scheckenbach et al. | |
| 6,011,116 A | 1/2000 | Aoyama et al. | |
| 6,262,224 B1 | 7/2001 | Zierer et al. | |
| 6,437,091 B1 | 8/2002 | Fodor et al. | |
| 6,949,288 B2 | 9/2005 | Hodge | |
| 7,378,148 B2 | 5/2008 | Morton-Finger et al. | |
| 7,442,744 B2 | 10/2008 | Tokushige et al. | |
| 7,462,672 B2 | 12/2008 | Kobayashi et al. | |
| 2005/0123750 A1 | 6/2005 | Hodge | |
| 2007/0225450 A1 | 9/2007 | Kobayashi et al. | |
| 2009/0156075 A1 | 6/2009 | Rollin, Jr. et al. | |
| 2009/0214863 A1 | 8/2009 | Kreider et al. | |
| 2013/0005889 A1 | 1/2013 | Ritter | |
| 2013/0005890 A1 | 1/2013 | Ritter | |
| 2013/0009333 A1 | 1/2013 | Krishnamurthy | |
| 2013/0011544 A1 | 1/2013 | Pollino | |

(Continued)

FOREIGN PATENT DOCUMENTS

| | | |
|---|---|---|
| EP | 0345094 A1 | 12/1989 |
| EP | 0406553 A2 | 1/1991 |
| EP | 0431470 A2 | 6/1991 |
| EP | 2065500 A1 | 6/2009 |
| JP | 05078575 A | 3/1993 |
| JP | 05162190 A | 6/1993 |
| JP | 1993-171041 A * | 9/1993 |
| JP | 2007090563 A1 | 12/2007 |

OTHER PUBLICATIONS

Polyacrylate—Sigma Aldrich.*
CAS Record for Arasorb 800F.*
Nunes et al ("Influenece of Molecular weight and molecular weight distribution on mechanical properties of polymers", Polymer Engineering & Science, 22(4), p. 205-228 and Abstract, Mar. 1982).*
Corresponding case PCT/US2011/029339, International Search Report, Korean Intellectual Property Office, Seo-gu, Daejeon, Republic of Korea, Authorized Officer Kim Rahn Nov. 30, 2011.

*Primary Examiner* — Randy Gulakowski
*Assistant Examiner* — Christopher M Rodd

(57) ABSTRACT

A method for accelerating the curing of a polyarylene sulfide. The polyarylene sulfide is blended with a cure accelerator to form a mixture where the weight percentage of accelerator is between 0.2% and 15.0% of the total weight of the blend. The mixture is cured at 320° C. or above for at least 20 minutes. The cure accelerator is a compound selected from the group consisting of ionomers, hindered phenols, polyhydric alcohols, polycarboxylates, and mixtures of the foregoing.

2 Claims, No Drawings

(56) References Cited

U.S. PATENT DOCUMENTS

2013/0012092 A1 1/2013 Pollino
2013/0012637 A1 1/2013 Ritter
2013/0012638 A1 1/2013 Ritter
2013/0012671 A1 1/2013 Pollino
2013/0018134 A1 1/2013 Christell

* cited by examiner

CURE ACCELERATION OF POLYMERIC STRUCTURES

FIELD

This application is related to the field of curing or cross linking of polymers, and in particular polyarylene sulfides.

BACKGROUND

Polymeric materials, and in particular polyarylene sulfide ("PAS") polymers, and polyphenylene sulfide (PPS) exhibit a degree of thermal and chemical resistance. As such, polymers have found use in many applications, for example, in the manufacture of molded components for automobiles, electrical and electronic devices, industrial/mechanical products, consumer products, and spun fibers. For example, polyphenylene sulfide exhibits an outstanding thermal stability and a very good chemical resistance, which make it a material of choice for the extrusion or molding of components which can be employed especially in electrical and electronic applications and in the motor vehicle industry. However, PPS has the disadvantage of having a low impact strength and hence of being brittle.

The present invention provides for PAS containing compositions with improved physical properties associated with cross linking such as impact strength and toughness.

SUMMARY

The present invention is directed to a method for accelerating the curing of a polyarylene sulfide comprising the steps of (i) blending the polyarylene sulfide with a cure accelerator to form a mixture where the weight percentage of accelerator is between 0.2% and 15.0% of the total weight of the blend, (ii) curing the mixture at 320° C. or above for at least 20 minutes.

The cure accelerator is a compound selected from the group consisting of ionomers, hindered phenols, polyhydric alcohols, polycarboxylates, and mixtures of the foregoing.

The method of claim 1 in which the step of curing the mixture takes place for at least 30 minutes. In a further embodiment, the step of curing takes place for at least 40 minutes, or even 60 minutes.

In a still further embodiment of the method the cure accelerator is present at between 1% and 10% of the total weight of the blend.

In a still further embodiment, the polyarylene sulfide is polyphenylene sulfide.

DESCRIPTION

This invention relates to polyphenylene sulfide-based compositions with improved impact strength. It relates more precisely to compositions containing a polyphenylene sulfide and a product resulting from crosslinking with an ionomer. It also relates to a process for preparing these compositions.

The following definitions are used herein and should be referred to for interpretation of the claims and the specification.

The term "PAS" means polyarylene sulfide.

The term "PPS" means polyphenylene sulfide.

The term "thermal stability", as used herein, refers to the degree of change in the weight average molecular weight of a PAS polymer induced by elevated temperatures in the absence of oxygen. As the thermal stability of a given PAS polymer improves, the degree to which the polymer's weight average molecular weight changes over time decreases. Generally, in the absence of oxygen, changes in molecular weight are often considered to be largely due to chain scission, which typically decreases the molecular weight of a PAS polymer.

The term "thermo-oxidative stability", as used herein, refers to the degree of change in the weight average molecular weight of a PAS polymer induced by elevated temperatures in the presence of oxygen. As the thermo-oxidative stability of a given PAS polymer improves, the degree to which the polymer's weight average molecular weight changes over time decreases. Generally, in the presence of oxygen, changes in molecular weight may be due to a combination of oxidation of the polymer and chain scission. As oxidation of the polymer typically results in cross-linking, which increases molecular weight, and chain scission typically decreases the molecular weight, changes in molecular weight of a polymer at elevated temperatures in the presence of oxygen may be challenging to interpret.

Polyarylene sulfides (PAS) include linear, branched or cross linked polymers that include arylene sulfide units. Polyarylene sulfide polymers and their synthesis are known in the art and such polymers are commercially available.

Exemplary polyarylene sulfides useful in the invention include polyarylene thioethers containing repeat units of the formula —$[(Ar^1)_n$—$X]_m$—$[(Ar^2)_i$—$Y]_j$—$(Ar^3)_k$—$Z]_l$—$[(Ar^4)_o$—$W]_p$— wherein $Ar^1$, $Ar^2$, $Ar^3$, and $Ar^4$ are the same or different and are arylene units of 6 to 18 carbon atoms: W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes at least 30 mol %, particularly at least 50 mol % and more particularly at least 70 mol % arylene sulfide (—S—) units. Preferably the polyarylene sulfide polymer includes at least 85 mol % sulfide linkages attached directly to two aromatic rings. Advantageously the polyarylene sulfide polymer is polyphenylene sulfide (PPS), defined herein as containing the phenylene sulfide structure —$(C_6H_4$—$S)_n$— (wherein n is an integer of 1 or more) as a component thereof.

A polyarylene sulfide polymer having one type of arylene group as a main component can be preferably used. However, in view of processability and heat resistance, a copolymer containing two or more types of arylene groups can also be used. A PPS resin comprising, as a main constituent, a p-phenylene sulfide recurring unit is particularly preferred since it has excellent processability and is industrially easily obtained. In addition, a polyarylene ketone sulfide, polyarylene ketone ketone sulfide, polyarylene sulfide sulfone, and the like can also be used.

Specific examples of possible copolymers include a random or block copolymer having a p-phenylene sulfide recurring unit and an m-phenylene sulfide recurring unit, a random or block copolymer having a phenylene sulfide recurring unit and an arylene ketone sulfide recurring unit, a random or block copolymer having a phenylene sulfide recurring unit and an arylene ketone ketone sulfide recurring unit, and a random or block copolymer having a phenylene sulfide recurring unit and an arylene sulfone sulfide recurring unit.

The polyarylene sulfides may optionally include other components not adversely affecting the desired properties thereof. Exemplary materials that could be used as additional components would include, without limitation, antimicrobials, pigments, antioxidants, surfactants, waxes, flow promoters, particulates, and other materials added to enhance processability of the polymer. These and other additives can be used in conventional amounts.

As noted above, PPS is an example of a polyarylene sulfide. PPS is an engineering thermoplastic polymer that is widely used for film, fiber, injection molding, and composite applications due to its high chemical resistance, excellent mechanical properties, and good thermal properties. However, the thermal and oxidative stability of PPS is considerably reduced in the presence of air and at elevated temperature conditions. Under these conditions, severe degradation can occur, leading to the embitterment of PPS material and severe loss of strength. Improved thermal and oxidative stability of PPS at elevated temperatures and in the presence of air are desired.

Processes for the manufacture of PPS which can be employed according to the invention are well known. They can all be employed. A process comprises heating an alkali metal sulphide, in most cases sodium sulphide hydrate, in a polar solvent in order to remove the water of hydration therefrom, followed by the addition of a dihalogenated aromatic compound, in particular p-dichlorobenzene, and polymerisation at higher temperature (see, for example, U.S. Pat. No. 3,354,129 (Phillips Petroleum)). The molecular weight of the PPS obtained can be increased in a known manner by oxidative aftertreatment resulting in branched products or by addition of known agents for increasing the molecular weight (water, esters, anhydrides and alkali metal carboxylates and sulphonates, etc.) to the polycondensation mixture, resulting in linear products of high molecular weight.

The PPS which can be employed according to the invention may contain conventional additives in quantities which are not detrimental to the properties of the compositions according to the invention. By way of such additives there may be mentioned in particular: anti-oxidants and heat stabilisers such as, for example, hindered phenols, thioesters and phosphites, anti-UV agents such as, for example, resorcinol, benzotriazole and benzophenone, flame-retardant agents such as, for example, antimony salts, aryl chlorophosphates and chlorinated paraffins, antistatic agents such as, for example, dodecylbenzenesulphonate and polyalkylene glycols, lubricants such as, for example, graphite, molybdenum disulphide and silicones, corrosion inhibitors such as, for example, alkali metal carbonates, pigments such as, for example, titanium dioxide and zinc sulphide, processing aids such as, for example, aromatic esters of phosphoric acid and microtalc, agents for controlling the degree of crosslinking such as, for example, peroxides, crosslinking accelerators such as, for example, metal salts of thiophosphinic acid, crosslinking inhibitors such as, for example, dialkyltin dicarboxylates or aminotriazole, and the like.

Small quantities of other polymers may also be added to the PPS.

Ionomers suitable for use in the invention can comprise repeat units derived from an ethylene acid copolymer either not neutralized or with partial neutralization of the carboxylic acid groups with a metal on including alkali metal, transition metal, alkaline earth metal, or combinations of two or more thereof. The neutralization can be from 0% to about 100%, from 30% to 90%, or 60%, to 80%, or to 90%, or even to 100%. Examples of metals include lithium, sodium, potassium, magnesium, calcium, zinc, or combinations of two or more thereof. Metal compounds can include formates, acetates, nitrates, carbonates, hydrogencarbonates, oxides, hydroxides, alkoxides of the metal ions, or combinations of two or more thereof.

An acid copolymer can comprise repeat units derived from ethylene, an $\alpha,\beta$-unsaturated C3-C8 carboxylic acid, and optionally a comonomer. Preferred $\alpha,\beta$-unsaturated C3-C8 carboxylic acids include acrylic acid, methacrylic acid, or combinations thereof.

The comonomer can be present from about 3 to about 25 weight % including an ethylenically unsaturated dicarboxylic acid such as maleic anhydride, ethyl hydrogen maleate, itaconic acid, CO, glycidyl (meth)acrylic acid or its alkyl ester, or combinations of two or more thereof.

Acid copolymer can be described as E/X/Y copolymers where E is ethylene, X is the $\alpha,\beta$-ethylenically unsaturated carboxylic acid, and Y is the comonomer. X can be present in 3 to 30 (or 4 to 25, or 5 to 20) weight % of the polymer, and Y can be present in 0 to 30 (or 0 to 25) weight % of the polymer. Specific acid copolymers can include ethylene/ (meth)acrylic acid copolymer, ethylene/(meth)acrylic acid/n-butyl (meth)acrylate copolymer, ethylene/(meth)acrylic acid/iso-butyl (meth)acrylate copolymer, ethylene/(meth)acrylic acid/methyl (meth)acrylate copolymer, ethylene/(meth) acrylic acid/ethyl(meth)acrylate copolymer, or combinations of two or more thereof.

Methods of preparing such ionomers are well known. See, e.g., U.S. Pat. Nos. 3,264,272, 4,351,931, and 5,028,674, the disclosures of which are incorporated herein by reference and the description of the methods is omitted for the interest of brevity. An example of commercial ionomer is Surlyn® available from E. I. du Pont de Nemours and Company (DuPont).

Two or more ionomers can be blended and used as the ionomer component. For example, a blend of about 10 to about 40 weight % of zinc-neutralized ionomer and about 60 to about 90 weight % of sodium-neutralized ionomer can be used to produce a final composition, for example, comprising about 80% polyamide, 15% sodium-neutralized ionomer, and 5% zinc-neutralized ionomer, all by weight.

By "hindered phenol" here is meant any compound with a phenol ring and a tertiary butyl group in the 2- or 6-position to the phenol. Examples would be the Irganox® range of products marketed by BASF under the trademarks Irganox® 1330 and Irganox® 1010.

Examples of polyhydric alcohols containing more than two hydroxyl groups include, without limitation, triols, such as glycerol, trimethylolpropane, 2,3-di-(2'-hydroxyethyl)-cyclohexan-1-ol, hexane-1,2,6-triol, 1,1,1-tris-(hydroxymethyl)ethane, 3-(2'-hydroxyethoxy)-propane-1,2-diol, 3-(2'-hydroxypropoxy)-propane-1,2-diol, 2-(2'-hydroxyethoxy)-hexane-1,2-diol, 6-(2'-hydroxypropoxy)-hexane-1,2-diol, 1,1,1-tris-[(2'-hydroxyethoxy)-methyl]-ethane, 1,1,1-tris-[(2'-hydroxypropoxy)-methyl]-propane, 1,1,1-tris-(4'-hydroxyphenyl)-ethane, 1,1,1-tris-(hydroxyphenyl)-propane, 1,1,3-tris-(dihydroxy-3-methylphenyl)-propane, 1,1,4-tris-(dihydroxyphenyl)-butane, 1,1,5-tris-(hydroxyphenyl)-3-methylpentane, di-trimethylolpropane, trimethylolpropane ethoxylates, or trimethylolpropane propoxylates; polyols such as pentaerythritol, dipentaerythritol, and tripentaerythritol; and saccharides having more than two hydroxyl groups, such as cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol, and D-gulonic-y-lactone and the like.

Preferred polyhydric alcohols include those having a pair of hydroxyl groups which are attached to respective carbon atoms which are separated one from another by at least one atom. Especially preferred polyhydric alcohols are those in which a pair of hydroxyl groups is attached to respective carbon atoms which are separated one from another by a single carbon atom.

Preferably, the one or more polyhydric alcohols are independently selected from pentaerythritol, dipentaerythritol, tripentaerythritol, di-trimethylolpropane, D-mannitol, D-sorbitol, xylitol and mixtures thereof. More preferably, the one or more polyhydric alcohols are independently selected from dipentaerythritol, tripentaerythritol, pentaerythritol and mixtures thereof. Still more preferably, the one or more polyhydric alcohols are dipentaerythritol and/or pentaerythritol.

Examples of poly(carboxylates) are any polymeric molecule that comprises a multiplicity of carboxyl groups on the main chain or appended to a group attached to the main chain. Examples include, without limitation: polymethylmethacrylate, poly(acrylic acid), poly(methacrylic acid), Nucrel® (copolymer of poly(acrylic acid), and poly(ethylene)), Surlyn®, polyacrylamide, and polymethacrylamide

EXAMPLES

The present invention is further illustrated in the following examples.

Materials

The following materials were used in the examples. All commercial materials were used as received unless otherwise indicated. Fortron® 309 polyphenylene sulfide and Fortron® 317 polyphenylene sulfide were obtained from Ticona (Florence, Ky.). Surlyn® 9910 was obtained from DuPont Packaging and Industrial Polymers (Wilmington, Del.), Calcium stearate (99%) was obtained from Sigma Aldrich (St. Louis, Mo.).

Surlyn® 9910 is also referred to herein as Surlyn. Calcium stearate is also referred to herein as CaSt.

Analytical Methods:

Differential Scanning Calorimetry (DSC):

The thermo-oxidative stability of PPS compositions were assessed by measuring changes in melting point (Tm) as a function of exposure time in aft. In one analysis method, solid PPS compositions were exposed in air at 250° C. for 10 days. In a second analysis method, molten PPS compositions were exposed in air at 320° C. for 3 hours. In a third analysis method, molten PPS compositions were first pre-treated via air exposure at varying temperatures and times. The resulting thermo-oxidative stability of pre-treated samples was subsequently determined by measuring changes in melting point following air exposure for 10 days at 250° C. In each analysis method, melting point retention was quantified and reported as ΔTm (° C.). Lower ΔTm (° C.) values indicated higher thermo-oxidative stability.

DSC Method A: Solid-State Air Aging at 250° C.

In the 250° C. method, a sample was weighed and placed in a 2 inch circular aluminum pan on the middle rack of a 250° C. preheated convection oven with active circulation. After 10 days of air aging the samples were removed and stored for evaluation by differential scanning calorimetry (DSC). DSC was performed using a TA instruments 0100 equipped with a mechanical cooler. Samples were prepared by loading 8-12 mg of air-aged polymer into a standard aluminum DSC pan and crimping the lid. The temperature program was designed to erase the thermal history of the sample by first heating it above its melting point from 35° C. to 320° C. at 10° C./min and then allowing the sample to re-crystallize during cooling from 320° C. to 35° C. at 10° C./min. Reheating the sample from 35° C. to 3200 at 10° C./min afforded the melting point of the air-aged sample, which was recorded and compared directly to the melting point of a non-aged sample of the same composition. The entire temperature program was carried out under a nitrogen purge at a flow rate of 50 mL/min. All melting points were quantified using TA's Universal Analysis software via the software's linear peak integration function.

DSC Method B. Melt-State Air Aging at 320° C.

In the 320° C. method, samples were placed inside a standard aluminum DSC pan without a lid. DSC was performed using a TA instruments Q100 equipped with a mechanical cooler. The temperature program was designed to melt the polymer under nitrogen, expose the sample to air at 320° C. for 20 min, re-crystallize the air-exposed sample under nitrogen, and then reheat the sample to identify changes in the melting point. Thus, each sample was heated from 35° C. to 320° C. at 20° C./min under nitrogen (flow rate: 50 ml/min) and held isothermally at 320° C. for 5 min, at which point the purge gas was switched from nitrogen to air (flow 50 mL/min) while maintaining a temperature of 320° C. for 180 minutes. Subsequently, the purge gas was switched back from air to nitrogen (flow rate: 50 mL/min) and the sample was cooled from 320° C. to 35° C. at 10° C./min and then reheated from 35° C. to 320° C. at 10° C./min to measure the melting point of the air-exposed material. All melt curves were bimodal. The melting point of the lower melt was quantified using TA's Universal Analysis software via the software's inflection of the onset function.

DSC Method C: Pretreatment Followed by Solid-State Air Aging at 250° C.

A TA instruments Q100 DSC was used to pre-treat the samples via exposure to various elevated temperatures in air for various periods of time (Table 1). The temperature program was designed to melt the polymer under nitrogen, expose the sample to air at a defined set temperature for a specific period of time, and re-crystallize the air-exposed sample under nitrogen. Thus, each sample was placed inside a standard aluminum DSC pan without a lid and heated from 35° C. to its pre-defined set temperature at 20° C./min under nitrogen (flow rate: 50 mL/min) and held isothermally at the set temperature for 5 min, at which point the purge gas was switched from nitrogen to air (flow 50 mL/min) and the set temperature was maintained for a specified period of time. Table 1 outlines specific set temperatures and hold times investigated. Subsequently, the purge gas was switched back from air to nitrogen (flow rate: 50 mL/min) and the sample was cooled from 320° C. to 35° C. at 10° C./min. Following this pretreatment regiment, each aluminum pan containing pretreated sample was subjected to 250° C. solid-state air aging according to DSC Method A and the thermal-oxidative stability was assessed by measuring loss in Tm after 10 days.

TABLE 1

| Pretreatment Conditions Defined in DSC Method C | |
| --- | --- |
| Samples | PPS Control, Surlyn ®, calcium stearate |
| Pretreatment Temperatures | 295° C., 310° C., 320° C. |
| Pretreatment Times | 0 min, 1 min, 15 min, 30 min, 60 min |

Surface Electron Spectroscopy for Chemical Analysis (ESCA)

The chemical composition of the surface was investigated using Electron Spectroscopy for Chemical Analysis (ESCA) (also known as X-ray Photoelectron Spectroscopy (XPS). In this experiment, monochromatic aluminum X-rays are focused onto a 1.3×0.2 mm area on the polymer surface exciting core-level photoelectrons from surface atoms. Core and valence shell photoelectrons with binding energies characteristic of elements in the top 5-10 nm are ejected and their kinetic energies are analyzed to obtain qualitative and quantitative information on surface composition. In this study, the ESCA experiment was performed using a Ulvac-PHI Quantera SXM (Scanning X-ray Microprobe) with 100 u 100 W 18 kV monochromatic Aluminum X-ray setting. High resolution detail spectra were acquired using 55 eV pass energy with a 0.2 eV step size. Photoelectrons were collected at a 45 degree exit angle. PHI MultiPak software was used for data analysis. Detection limits are element-specific and are typically ~0.01-0.1 atom percent.

Example 1

Preparation of PPS Compositions

PPS Containing Surlyn® 9910

A PPS composition containing 3 weight percent Surlyn® 9910 (0.016 mol/kg based on metal atom) was prepared as follows. Fortron® 309 PPS (700 g), Fortron® 317 PPS (300 g), and Surlyn® 9910 (30.28 g) were combined in a glass jar, manually mixed, and placed on a Stoneware bottle roller for 5 min. The resultant mixture was subsequently melt compounded using a Coperion 18 mm intermeshing co-rotating twin-screw extruder. The conditions of extrusion included a maximum barrel temperature of 300° C., a maximum melt temperature of 310° C., screw speed of 300 rpm, with a residence time of approximately 1 minute and a die pressure of 14-15 psi at a single strand die. The strand was frozen in a 6 ft tap water trough prior to being pelletized by a Conair chopper to give a pellet count of 100-120 pellets per gram. 828 g of the pelletized composition was obtained.

PPS Containing Calcium Stearate

A PPS composition containing 1 weight percent Calcium Stearate (0.016 mol/kg based on metal atom) was prepared as follows, Fortron® 309 PPS (700 g), Fortron® 317 PPS (300 g), and Calcium Stearate (9.71 g) were combined in a glass jar, manually mixed, and placed on a Stoneware bottle roller for 5 min. The resultant mixture was subsequently melt compounded using a Coperion 18 mm intermeshing co-rotating twin-screw extruder. The conditions of extrusion included a maximum barrel temperature of 300° C., a maximum melt temperature of 310° C., screw speed of 300 rpm, with a residence time of approximately 1 minute and a die pressure of 14-15 psi at a single strand die. The strand was frozen in a 6 ft tap water trough prior to being pelletized by a Conair chopper to give a pellet count of 100-120 pellets per gram. 815 g of the pelletized composition was obtained.

PPS Control (No Additives)

A polymer blend comprising 30% weight percent Fortron® 309 and 70% weight percent Fortron® 317 was prepared as follows. Fortron® 309 PPS (700 g) and Fortron® 317 PPS (300 g) were combined in a glass jar, manually mixed, and placed on a Stoneware bottle roller for 5 min. The resultant mixture was subsequently melt compounded using a Coperion 18 mm intermeshing co-rotating twin-screw extruder. The conditions of extrusion included a maximum barrel temperature of 300° C., a maximum melt temperature of 310° C., screw speed of 300 rpm, with a residence time of approximately 1 minute and a die pressure of 14-15 psi at a single strand die. The strand was frozen in a 6 ft tap water trough prior to being pelletized by a Conair chopper to give a pellet count of 100-120 pellets per gram. 829 g of the pelletized composition was obtained.

Example 2

10-Day Solid State Air Aging of Fortron® 309

This example shows that changes in the Tm of PPS as a function of time are proportional to the thermo-oxidative stability of PPS. Ticona Fortron® 309 PPS pellets were exposed to heat (250° C.) and air or nitrogen for 0, 1, 5, and 10 days according to DSC Method A. In air, a linear decrease in Tm was observed as a function of time. In nitrogen, no significant effect change in Tm was observed (Table 2). Thus, loss in Tm provides a good indication of thermo-oxidative degradation (cross-linking and chain scission) but provides little information regarding thermal degradation (chain-scission). Without wishing to be bound by mechanism, it is believed that cross-linking significantly retards crystallite growth, which in turn decreases the melting point (Tm) of PPS. Therefore, the degree to which a particular sample maintains its original Tm following exposure to elevated temperatures in an air atmosphere may be proportional to the thereto-oxidative stability (TOS) of the sample.

TABLE 2

Melting Point Data for Fortron ® PPS aged in Air and Nitrogen at 250° C.

| Time (days) | Tm in Nitrogen (° C.) | Tm in Air (° C.) |
| --- | --- | --- |
| 0 | 279.43 | 279.60 |
| 1 | 280.04 | 280.39 |
| 5 | 280.59 | 271.29 |
| 10 | 280.82 | 257.13 |

Example 3

Cure Acceleration and Skin Formation

This example shows that surface curing/cross-linking is accelerated for PPS compositions containing Surlyn® when exposed to 320-340° C. in air for 20 min to 3 h.

Tm loss has been shown to be a direct consequence of oxidative curing/cross-linking. (Mai, K., M. Zhang, et al. (1994). "Double melting phenomena of poly(phenylene sulfide) and its blends." *J. Appl. Polym. Sci.* 51(1): 57-62.)

Table 3 provides ΔTm data as determined by DSC Method B. ΔTm is directly proportional to thermo-oxidative instability. Table 3 provides melting point data for various PPS compositions aged 3 hours at 320° C. in Air. It shows that ΔTm for Surlyn® and PPS control are 46° C. and 33° C. respectively. Thus, PPS compositions containing Surlyn® are less thermally stable and produce a higher density of cross-links than the control.

Without wishing to be bound or limited by mechanism, it is known that oxidative cross-linking in PPS occurs via a mechanistic pathway by which poly(phenylene sulfide) is oxidized to poly(phenylene sulfone), which subsequently evolves $SO_2$ gas to produce phenyl radicals which can undergo facile oxidative cross-linking Table 4 provides ESCA data showing changes in % carbon and % sulfur at the surface of PPS control and PPS-Surlyn® before and after exposure to 320° C. in air for 20 min. Following exposure, the surface of PPS control is comprised of 84% carbon and 13% sulfur whereas the PPS composition containing Surlyn® is comprised of 83% carbon and 7% sulfur, which indicates a significant loss in sulfur, presumably in the form of $SO_2$ evolution. The surface of the PPS-Surlyn® composition can therefore be seen to be more densely cured/cross-linked when compared to the control.

TABLE 3

Melting Point (Tm) Data for Samples Aged 3 Hours at 320° C. in Air

| Additives | Tm Initial (° C.) | Tm Final (° C.) | Δ Tm (° C.) |
|---|---|---|---|
| PPS Control | 281 | 248 | 33 |
| Surlyn ® | 282 | 237 | 46 |
| Calcium stearate | 281 | 246 | 35 |

TABLE 4

ESCA (% C, % S) Data for Samples Aged 20 min at 340° C. in Air

|  | Untreated Surface* | Treated Surface** |
|---|---|---|
| PPS Control (% C) | 84 | 84 |
| PPS Control (% S) | 12 | 13 |
| +Surlyn ® (% C) | 85 | 83 |
| +Surlyn ® (% S) | 12 | 7 |

*Untreated Surface = No exposure to elevated temperature or air
**Treated Surface = Aged 20 min at 340° C. in air It should be understood that the above examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

The invention claimed is:

1. A method for accelerating the curing of a polyarylene sulfide comprising the steps of (i) blending the polyarylene sulfide with a cure accelerator to form a mixture where the weight percentage of accelerator is between 0.2% and 15.0% of the total weight of the blend, and (ii) curing the mixture at 320° C. or above for at least 20 minutes; wherein the cure accelerator is a polyhydric alcohol, and the polyhydric alcohol is cyclodextrin, D-mannose, glucose, galactose, sucrose, fructose, xylose, arabinose, D-arabitol, or L-arabitol.

2. A method for accelerating the curing of a polyarylene sulfide comprising the steps of (i) blending the polyarylene sulfide with a cure accelerator to form a mixture where the weight percentage of accelerator is between 0.2% and 15.0% of the total weight of the blend, and (ii) curing the mixture at 320° C. or above for at least 20 minutes; wherein the cure accelerator is a polyhydric alcohol, and the polyhydric alcohol is hexane-1,2,6-triol.

* * * * *